United States Patent
Matsunaga

(10) Patent No.: US 10,497,277 B2
(45) Date of Patent: Dec. 3, 2019

(54) FEEDBACK PROVISION METHOD, SYSTEM, AND ANALYSIS DEVICE

(71) Applicant: SONY CORPORATION, Tokyo (JP)

(72) Inventor: Hideyuki Matsunaga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/325,248

(22) PCT Filed: Jun. 16, 2015

(86) PCT No.: PCT/JP2015/003013
§ 371 (c)(1),
(2) Date: Jan. 10, 2017

(87) PCT Pub. No.: WO2016/031107
PCT Pub. Date: Mar. 3, 2016

(65) Prior Publication Data
US 2017/0186335 A1    Jun. 29, 2017

(30) Foreign Application Priority Data

Aug. 28, 2014   (JP) ................. 2014-173882

(51) Int. Cl.
*A63B 69/36*  (2006.01)
*G09B 19/00*  (2006.01)
(Continued)

(52) U.S. Cl.
CPC ...... *G09B 19/0038* (2013.01); *A63B 24/0006* (2013.01); *A63B 60/46* (2015.10); *A63B 69/38* (2013.01); *G06F 3/016* (2013.01); *A63B 2220/40* (2013.01); *A63B 2220/72* (2013.01); *A63B 2220/75* (2013.01); *A63B 2220/803* (2013.01); *A63B 2220/805* (2013.01); *A63B 2220/808* (2013.01); *A63B 2220/833* (2013.01); *A63B 2220/89* (2013.01)

(58) Field of Classification Search
CPC .................................................. A63B 69/3614
See application file for complete search history.

(56) References Cited

U.S. PATENT DOCUMENTS 6,266,623 B1 *   7/2001   Vock ............... A42B 3/0433
                                                        702/41
2011/0230274 A1   9/2011   Lafortune et al.
(Continued)

FOREIGN PATENT DOCUMENTS

JP    2012-157644 A    8/2012
WO    WO 2013/136712 A1    9/2013

OTHER PUBLICATIONS

Alexander Amini "Tennis Sensor Data Analysis: An Automated System for Macro Motion Refinement", Obtained from URL: http://tennistek/webs.com/, 2011, 24 pages.
(Continued)

*Primary Examiner* — Omkar A Deodhar
(74) *Attorney, Agent, or Firm* — Xsensus, LLP

(57) ABSTRACT

There is provided a feedback provision method including specifying, by a processor, an action generated in a target and a generation time of the action on the basis of sensing data of the target, determining feedback to be provided in accordance with the specified action, and providing the feedback at a time corresponding to the generation time.

24 Claims, 9 Drawing Sheets

(51) Int. Cl.
*G06F 3/01* (2006.01)
*A63B 60/46* (2015.01)
*A63B 24/00* (2006.01)
*A63B 69/38* (2006.01)

(56) References Cited

U.S. PATENT DOCUMENTS

2014/0018181 A1* 1/2014 Blake ............... A63B 24/0006
 473/277
2014/0376876 A1* 12/2014 Bentley .................. A63F 13/00
 386/227
2015/0016685 A1 1/2015 Matsunaga et al.

OTHER PUBLICATIONS

International Search Report dated Sep. 30, 2015 in PCT/JP2015/003013 filed Jun. 16, 2015.

* cited by examiner

[Fig. 1]
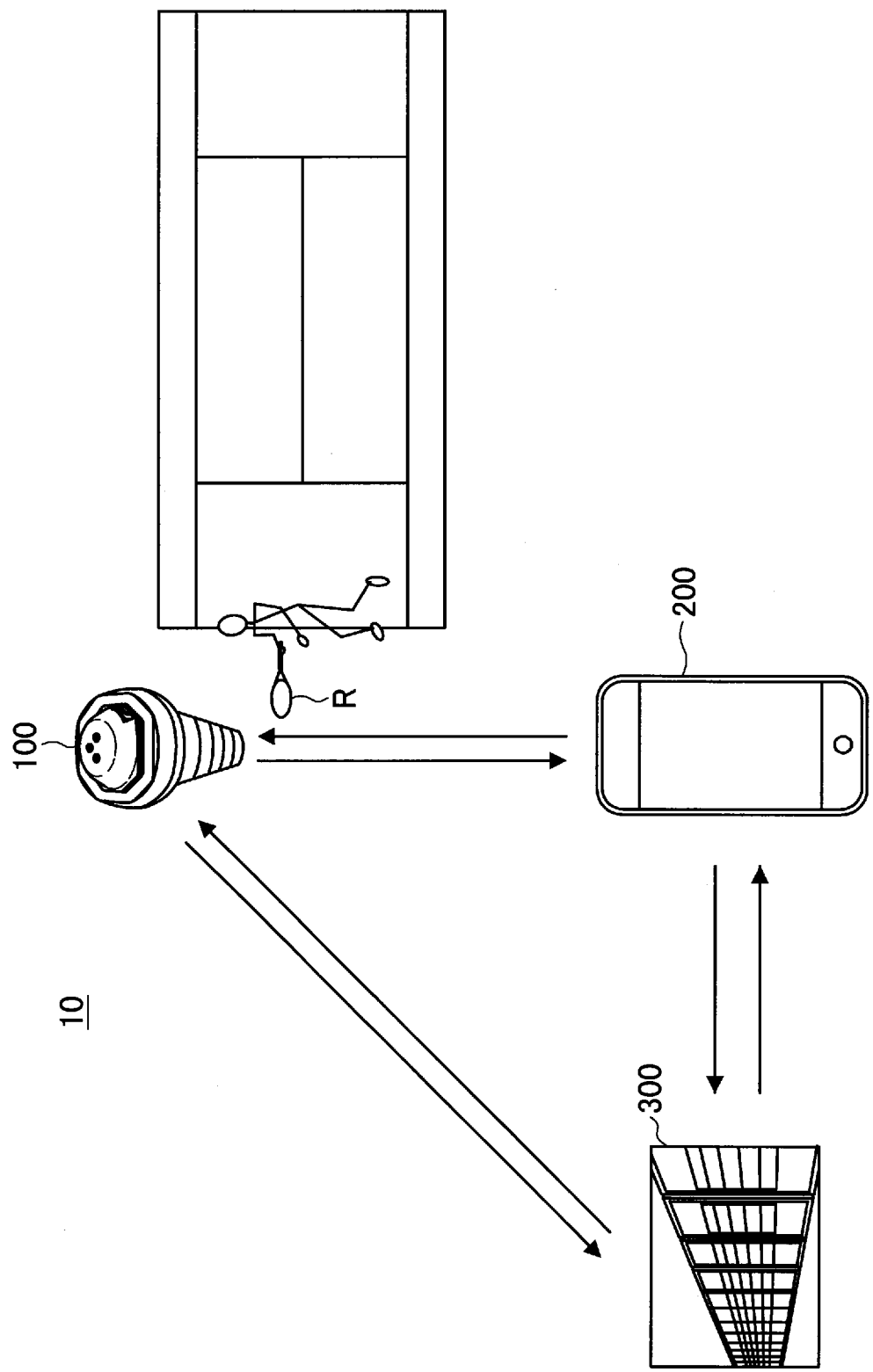

[Fig. 2]
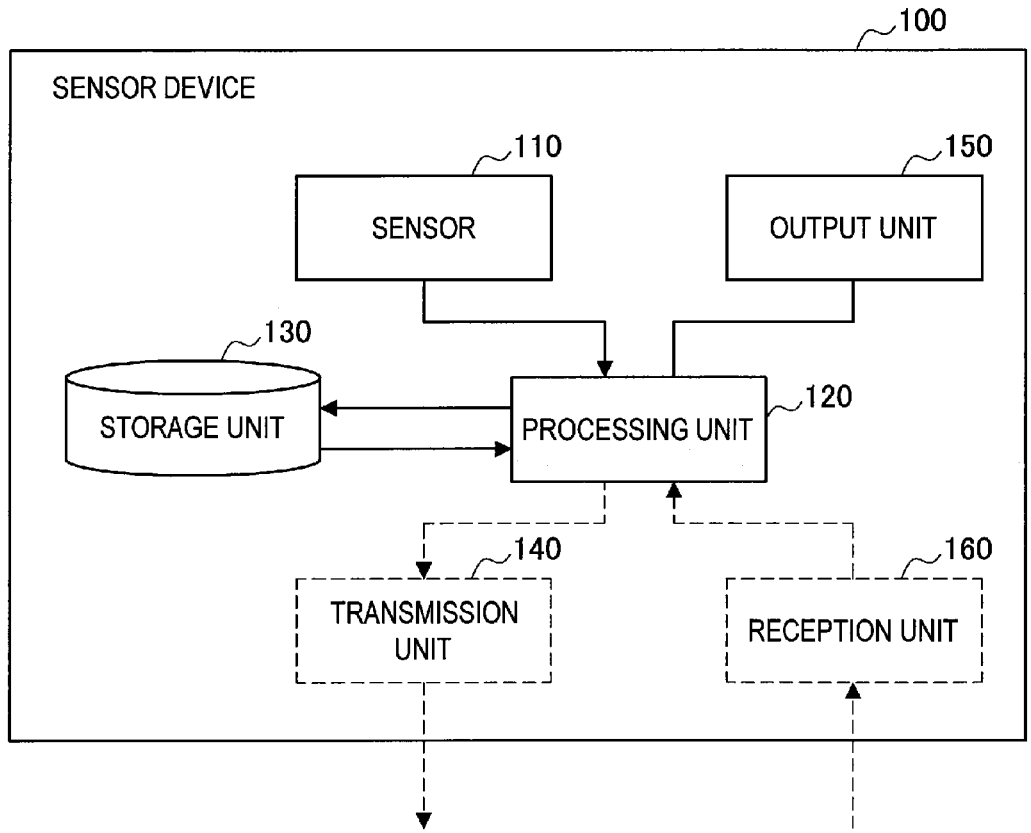
[Fig. 3]
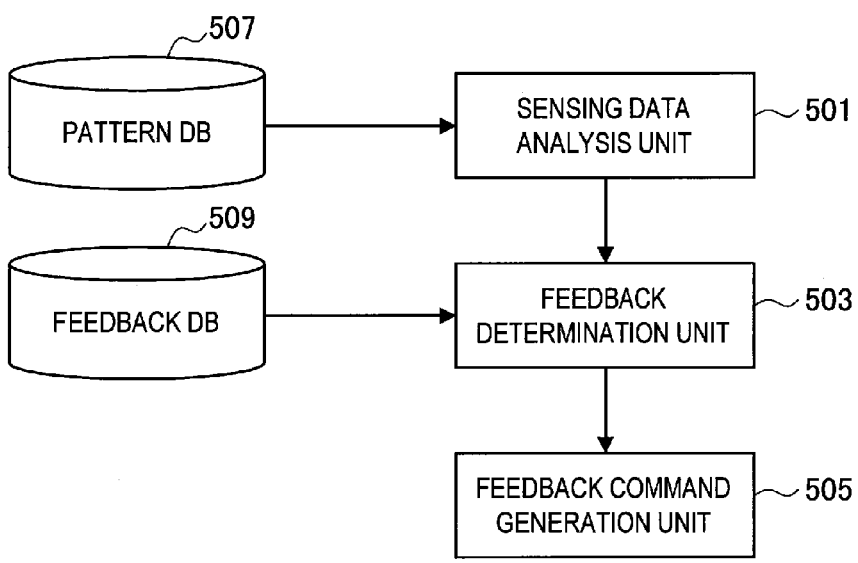

[Fig. 4]
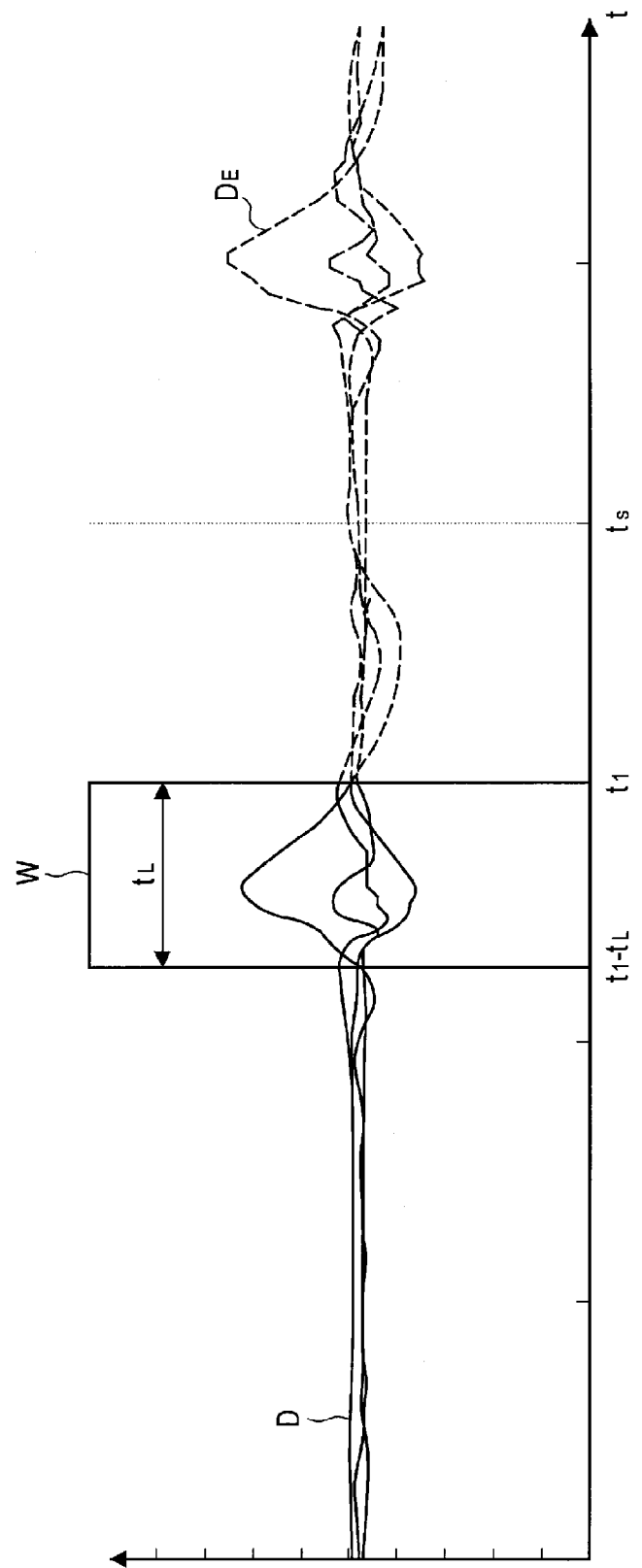

[Fig. 5]
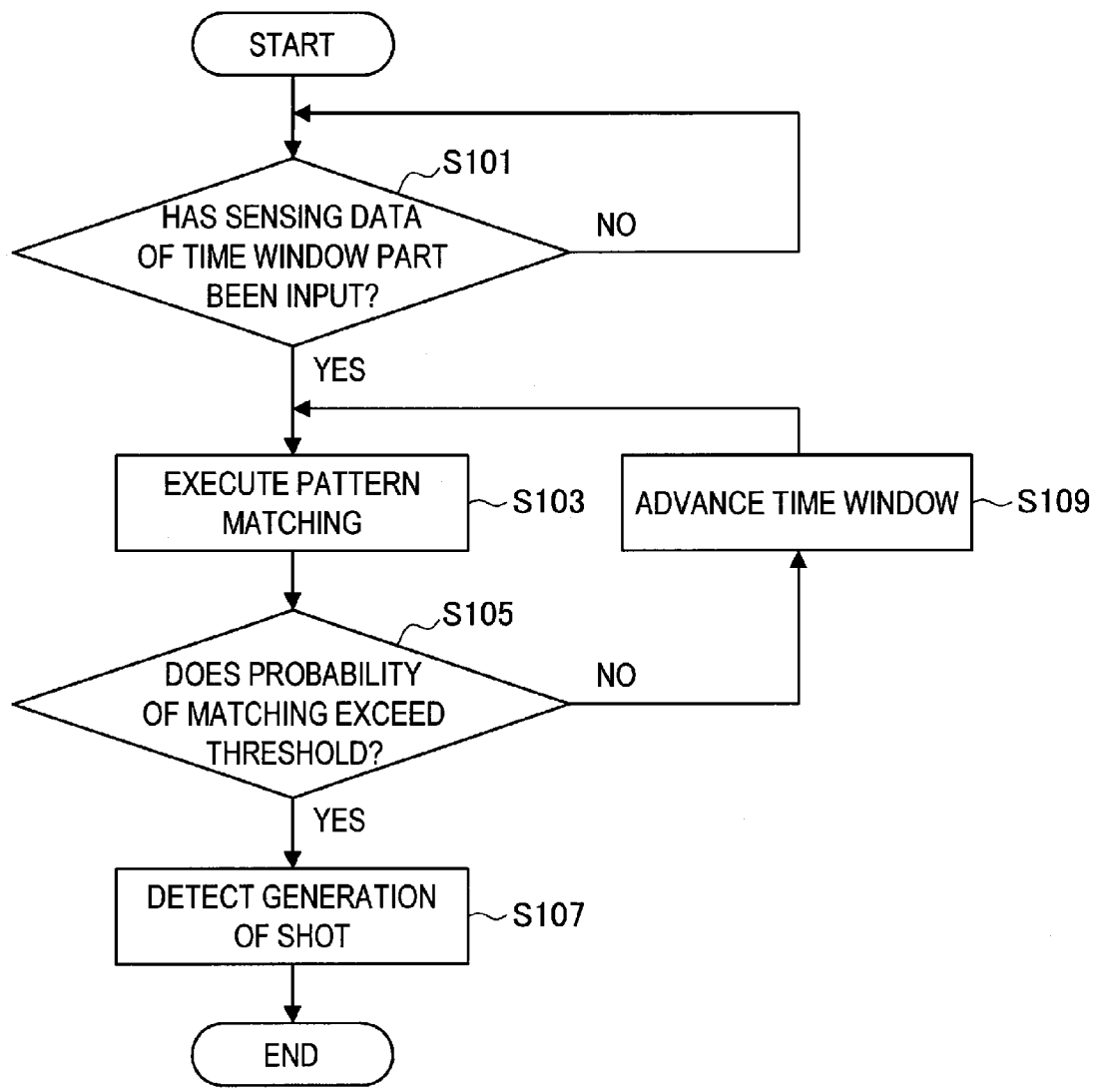

[Fig. 6]
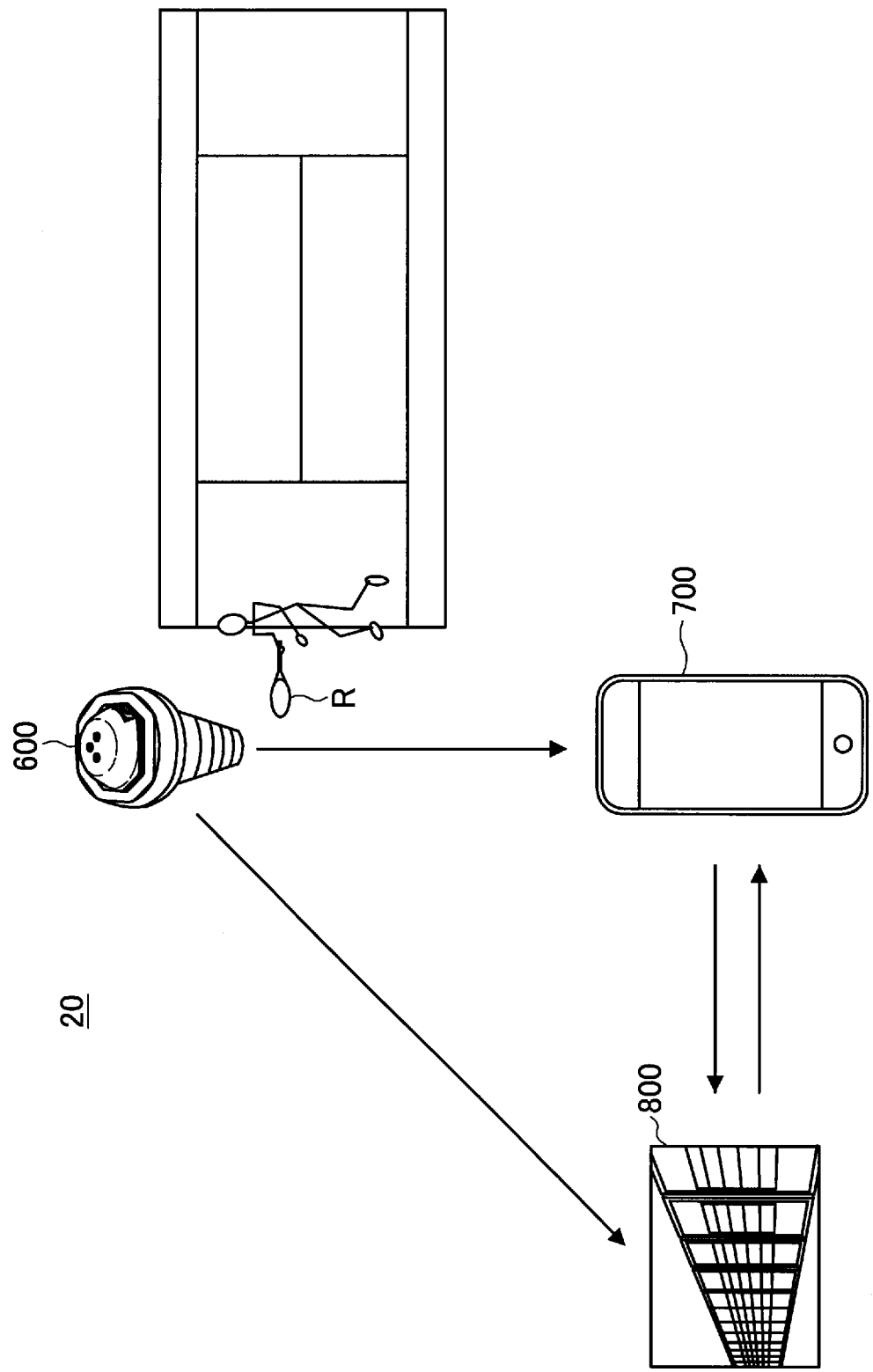

[Fig. 7]
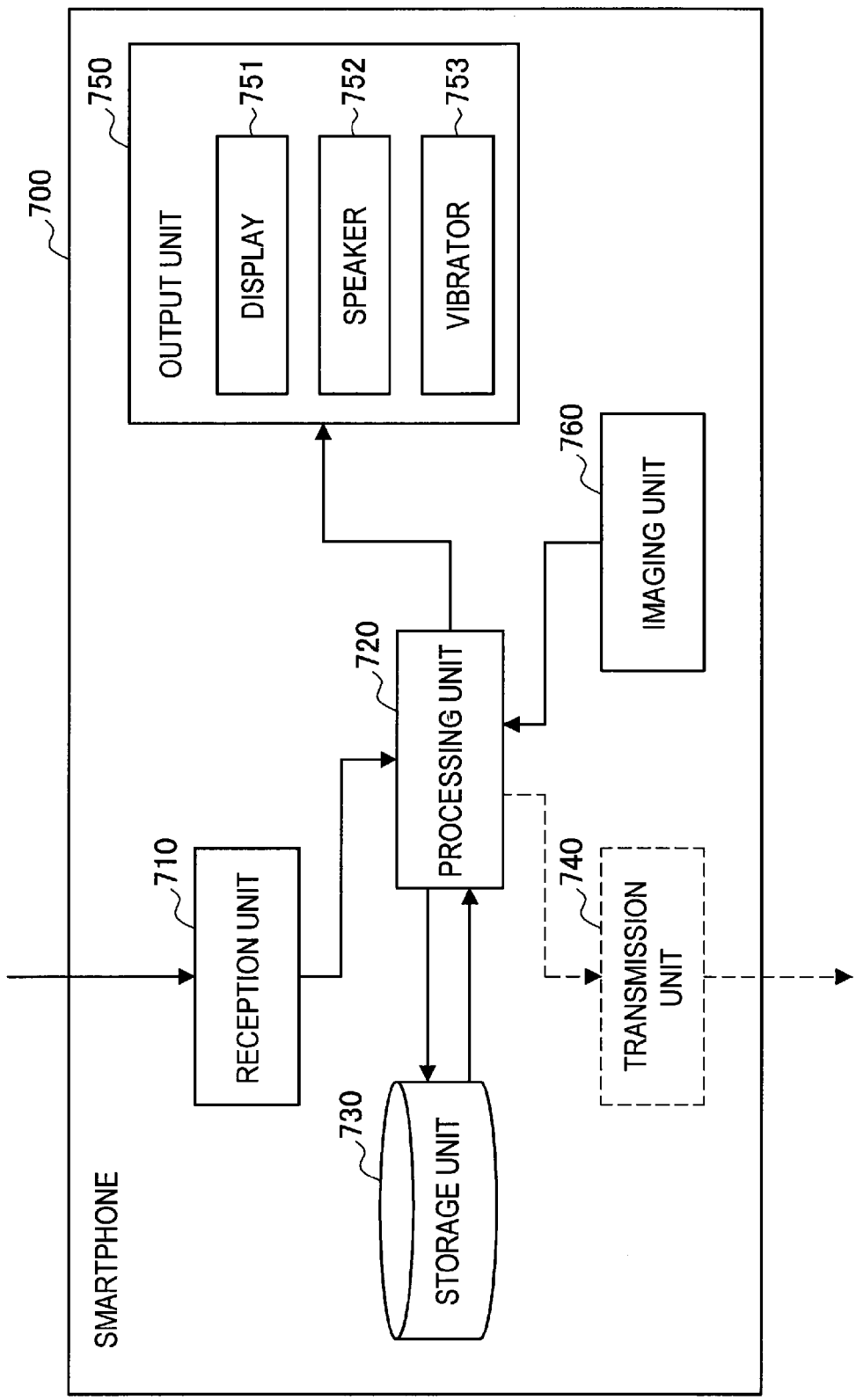

[Fig. 8]
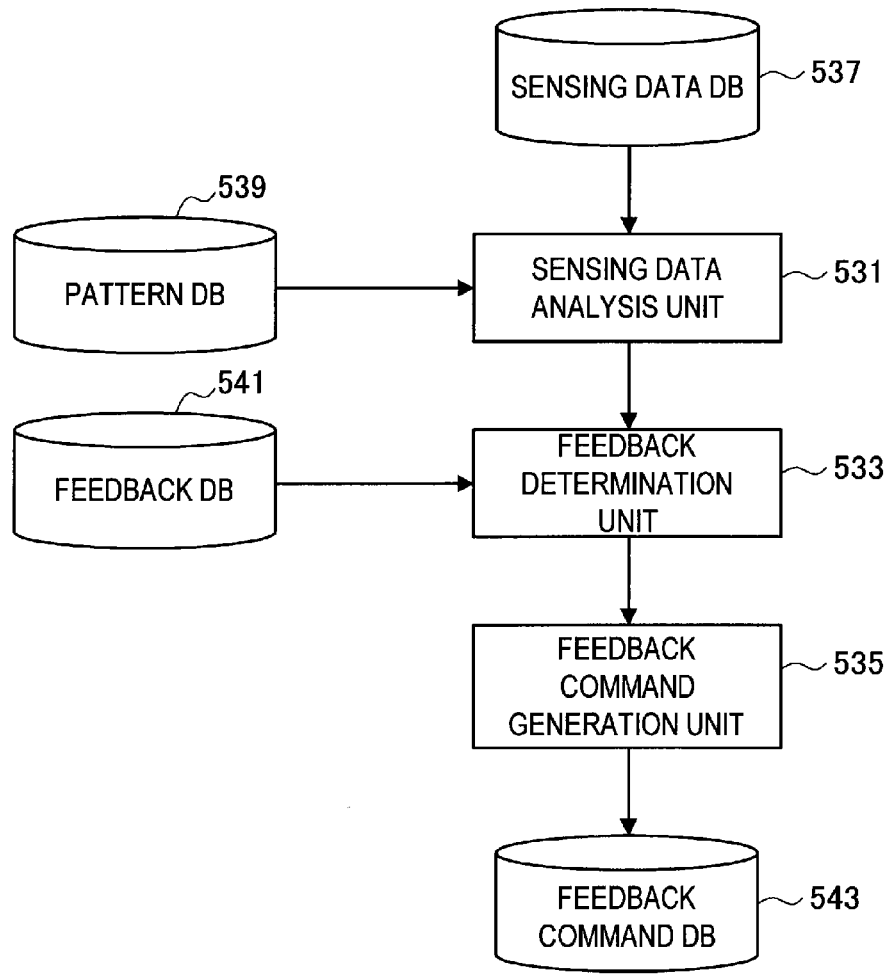
[Fig. 9]
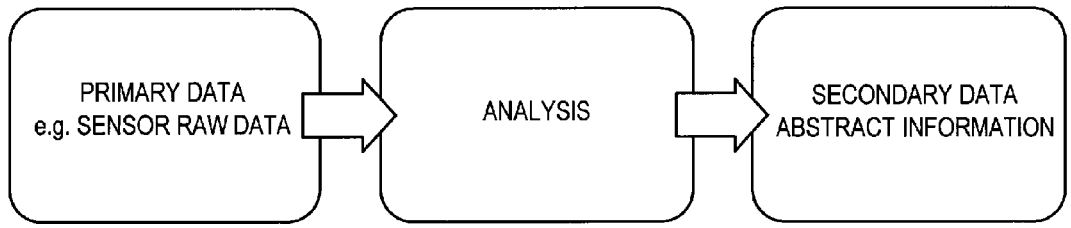

[Fig. 10]
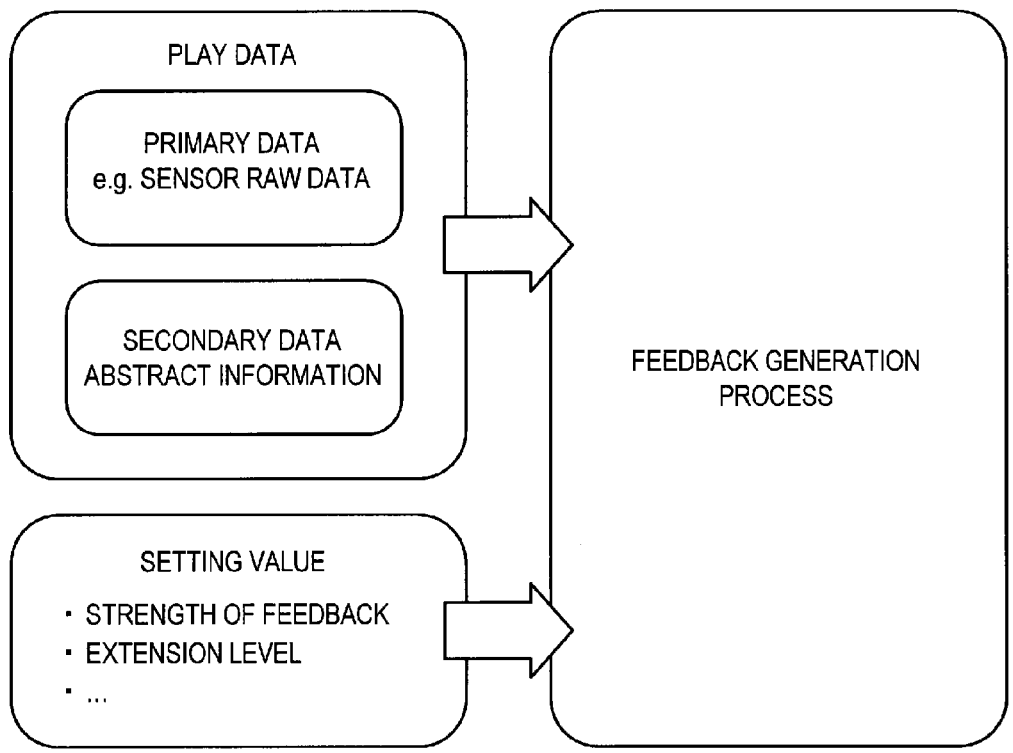
[Fig. 11]
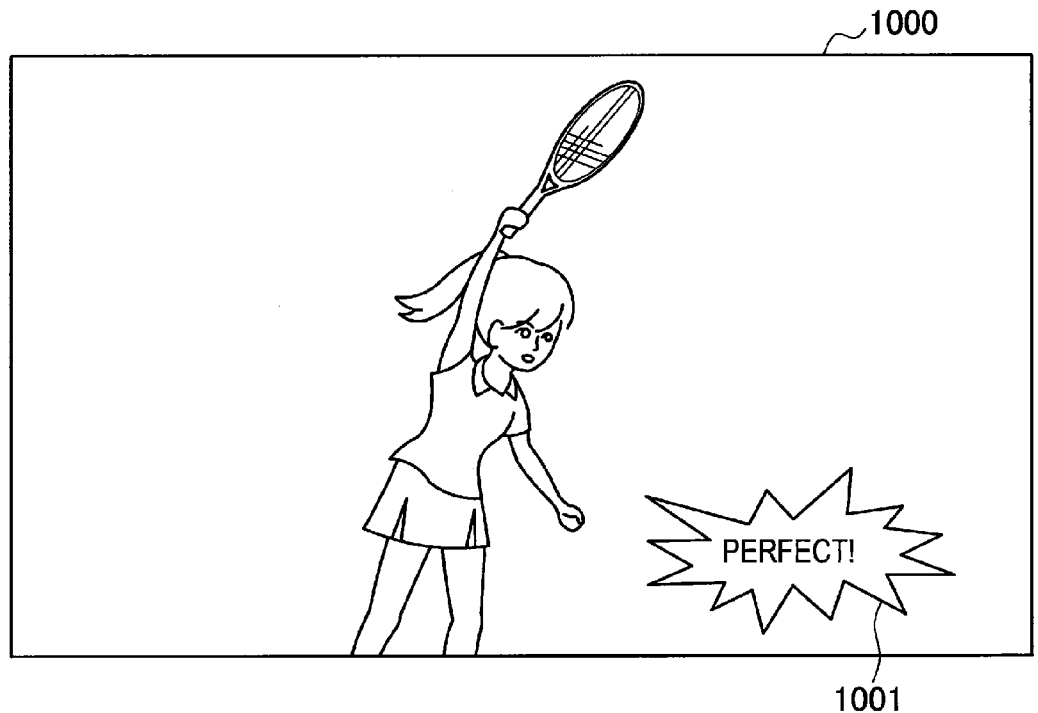

[Fig. 12]
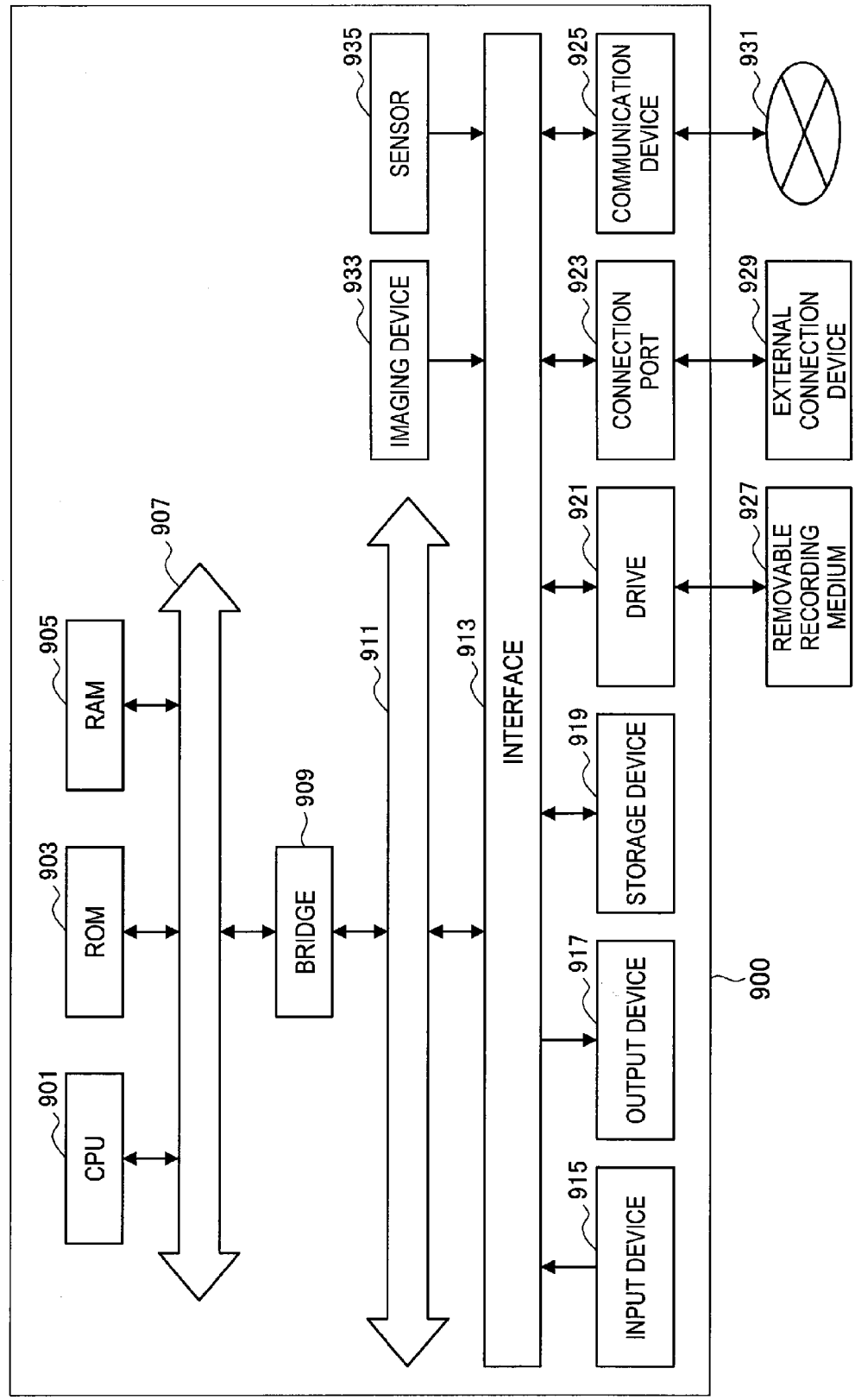

FEEDBACK PROVISION METHOD, SYSTEM, AND ANALYSIS DEVICE

CROSS REFERENCE TO RELATED APPLICATIONS

This application claims the benefit of Japanese Priority Patent Application JP 2014-173882 filed Aug. 28, 2014, the entire contents of which are incorporated herein by reference.

TECHNICAL FIELD

The present disclosure relates to a feedback provision method, a system, and an analysis device.

BACKGROUND ART

Until now, many technologies have been developed for supporting an improvement in a sport of a user by using sensing or analysis. For example, PTL 1 discloses technology for extracting feature information of a swing based on output data of a motion sensor. By using such technology, a user can objectively reflect on a play of a sport, and this result can be used for improvement.

CITATION LIST

Patent Literature

PTL 1: JP 2012-157644A

SUMMARY

Technical Problem

Incidentally, in a sport, apart from an actual play in a match or the like, it is common to relive a play or to perform a virtual play. Reliving a play includes, for example, reflecting on the play by viewing a picture in which the state of the play has been recorded. A virtual play includes, for example, practice such as that called a practice swing or shadow play. In such a setting, the experience of the user proceeds in a time axis the same or similar to that of an actual play. However, PTL 1 or the like merely discloses technology for mainly reflecting on a play as static data, and technology is not sufficiently provided to make a fuller reliving of a play or a virtual play.

Accordingly, embodiments of the present disclosure proposes a new and improved feedback provision method, system and analysis device capable of making an experience of a user fuller in a setting such as reliving a play or a virtual play in a sport, for example, by using sensing data.

Solution to Problem

According to an embodiment of the present disclosure, there is provided a feedback provision method including specifying, by a processor, an action generated in a target and a generation time of the action on the basis of sensing data of the target, determining feedback to be provided in accordance with the specified action, and providing the feedback at a time corresponding to the generation time.

According to another embodiment of the present disclosure, there is provided an analysis device including a sensing data analysis unit that specifies an action generated in the target and a generation time of the action on the basis of the sensing data, a feedback determination unit that determines feedback to be provided in accordance with the specified action, and a feedback command generation unit that generates a command for providing the feedback at a time corresponding to the generation time.

According to another embodiment of the present disclosure, there is provided a program causing a computer to achieve a function of specifying an action generated in a target and a generation time of the action on the basis of sensing data of the target, a function of determining feedback to be provided in accordance with the specified action, and a function of providing the feedback at a time corresponding to the generation time.

Advantageous Effects of Invention

According to one or more of embodiments of the present disclosure such as described above, an experience of a user can be made fuller in a setting such as reliving a play or a virtual play in a sport, for example, by using sensing data.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a figure which shows a configuration example of a system according to a first embodiment of the present disclosure.

FIG. 2 is a schematic block diagram which shows a configuration of a sensor device according to the first embodiment of the present disclosure.

FIG. 3 is a schematic block diagram which shows the functional configurations for an analysis process in the first embodiment of the present disclosure.

FIG. 4 is a figure for describing an analysis process of sensing data in the first embodiment of the present disclosure.

FIG. 5 is a flow chart which shows an example of an analysis process of sensing data according to the first embodiment of the present disclosure.

FIG. 6 is a figure which shows a configuration example of a system according to a second embodiment of the present disclosure.

FIG. 7 is a schematic block diagram which shows a configuration of a smartphone according to the second embodiment of the present disclosure.

FIG. 8 is a schematic block diagram which shows the functional configurations for an analysis process in the second embodiment of the present disclosure.

FIG. 9 is a figure which shows a relationship between observed sensing data in the first embodiment of the present disclosure and information obtained by analysis.

FIG. 10 is a figure for describing a generation process of feedback based on sensing data in the first embodiment of the present disclosure.

FIG. 11 is a figure which shows an example of feedback of an image in the second embodiment of the present disclosure.

FIG. 12 is a block diagram which shows a hardware configuration example of an information processing device according to an embodiment of the present disclosure.

DESCRIPTION OF EMBODIMENTS

Hereinafter, preferred embodiments of the present disclosure will be described in detail with reference to the The description will be given in the following order.
1. First embodiment
1-1. System configuration
1-2. Functional configurations and process flow
1-3. Modified example
2. Second embodiment
2-1. System configuration
2-2. Functional configurations
3. Example of feedback
4. Hardware configuration
5. Supplement

1. First Embodiment (1-1. System Configuration)

FIG. 1 is a figure which shows a configuration example of a system according to a first embodiment of the present disclosure. With reference to FIG. 1, the system 10 includes a sensor device 100. The system 10 may additionally include a smartphone 200 and/or a server 300. Note that, the sensor device 100 and the smartphone 200 may be implemented, for example, by a hardware configuration of an information processing device, which will be described later. The server 300 may be implemented by a single server device having a hardware configuration of an information processing device, which will be described later, or by collaboration between a plurality of server devices having such a configuration.

The sensor device 100 is attached to a tennis racket R. The sensor device 100 includes a sensor. The sensor provides sensing data of the racket R or a user who uses the racket R. In the illustrated example, the racket R or the user is treated as a target of sensing. Further, the sensor device 100 includes an output device. The output device provides feedback to the user, for example, by a picture, audio, vibration or the like. In addition, the sensor device 100 may include a processor which executes an analysis process for providing feedback based on the sensing data. Alternatively, the sensor device 100 may transmit sensing data to the smartphone 200 or the server 300, and may request an analysis process for providing feedback based on the sensing data. In this case, the sensor device 100 receives information related to feedback, from the smartphone 200 or the server 300.

The smartphone 200 receives sensing data transmitted from the sensor device 100, by wireless communication such as Bluetooth (registered trademark). Further, the smartphone 200 transmits information related to feedback obtained by the analysis process of the sensing data to the sensor device 100 by wireless communication. The smartphone 200 may execute an analysis process by itself, or may request an analysis process to the server 300. In the case of the former, a processor included in the smartphone 200 executes an analysis process. In the case of the latter, sensing data is transmitted from the smartphone 200 to the server 300 by network communication, and information related to feedback is transmitted from the server 300 to the smartphone 200. Note that, the smartphone 200 is an example of a terminal device different from the sensor device 100, which is carried by a user. Therefore, the smartphone 200 may be substituted, for example, by another type of terminal device such as a tablet or a personal computer.

The server 300 receives sensing data transmitted from the sensor device 100 or the smartphone 200, by network communication. The sensor device 100 may be capable of directly communicating with the server 300, and not via the smartphone 200. Further, the server 300 transmits information related to feedback obtained by an analysis process of sensing data to the sensor device 100 or the smartphone 200 by network communication. In the case where the system 10 includes the server 300, a processor included in one or a plurality of server devices, which implement the server 300, executes an analysis process.

FIG. 2 is a schematic block diagram which shows a configuration of the sensor device according to the first embodiment of the present disclosure. With reference to FIG. 2, the sensor device 100 includes a sensor 110, a processing unit 120, a storage unit 130, a transmission unit 140, an output unit 150, and a reception unit 160. Note that, the processing unit 120 is implemented by having a processor such as a CPU operate in accordance with programs. The storage unit 130 is implemented by a memory or a storage device. The transmission unit 140 and the reception unit 160 are implemented by a communication device. The output unit 150 is implemented by an output device. Hereinafter, each of the constituent elements will be additionally described.

The sensor 110 includes, for example, an acceleration sensor, a gyro sensor, a geomagnetic sensor and/or a vibration sensor. In the present specification, these sensors will be collectively called a motion sensor. Further, the sensor 110 may include a temperature sensor, a humidity sensor, an audio sensor or an illuminance sensor. The sensor 110 provides sensing data by setting the racket R or a user who uses the racket R as a target. The user who uses the racket R may be a user who plays a sport. Further, the racket R may be a tool used by the user.

The processing unit 120 pre-processes, for example, sensing data provided by the sensor 110. Pre-processing includes, for example, sampling, noise removal or the like, and is implemented as necessary. The processing unit 120 may at least temporarily accumulate sensing data in the storage unit 130. The processing unit 120 may execute an analysis process for providing feedback based on the sensing data. In this case, the processing unit 120 implements functional configurations for an analysis process, which will be described later. Alternatively, the processing unit 120 may transmit sensing data to the smartphone 200 or the server 300 via the transmission unit 140, and may receive information related to feedback via the reception unit 160.

In addition, the processing unit 120 controls the output unit 150, based on information obtained by an analysis process executed by itself, or received from the smartphone 200 or the server 300. In this way, the output unit 150 provides feedback to the user. For example, the output unit 150 includes a vibrator, and provides feedback to the user by transmitting a vibration to the racket R. Further, for example, the output unit 150 includes a speaker, and provides feedback to the user by outputting audio.

As described above, in the present embodiment, the system 10 may include the smartphone 200 and/or the server 300. In this case, the analysis process executed by the processing unit 120 of the sensor device 100 in the above example is implemented by a processor of the smartphone 200 or the server 300. Therefore, in this case, the processor of the smartphone 200 or the server 300 implements functional configurations for an analysis process, which will be described later.

(1-2. Functional Configurations and Process Flow)

FIG. 3 is a schematic block diagram which shows the functional configurations for an analysis process in the first embodiment of the present disclosure. With reference to FIG. 3, the functional configurations include a sensing data analysis unit 501, a feedback determination unit 503, and a feedback command generation unit 505. As described above, these functional configurations are implemented by a processor of the sensor device 100, the smartphone 200 or the server 300. Further, the above functional configurations may refer to a pattern database (DB) 507 and a feedback DB 509. The pattern DB 507 and the feedback DB 509 are implemented by a memory or a storage device of the sensor device 100, the smartphone 200 or the server 300.

(Sensing Data Analysis Unit)

The sensing data analysis unit 501 specifies an action generated in a target and a generation time of the action, based on sensing data of the target. In the present embodiment, the target of sensing is the racket R or a user who uses the racket R. The sensing data includes, for example, data provided by an acceleration sensor, a gyro sensor, a geomagnetic sensor and/or a vibration sensor. Further, the sensing data may include data provided by a temperature sensor, a humidity sensor, an audio sensor, an illuminance sensor or the like. The action includes, for example, an event generated in a play of tennis using the racket R, and more specifically, a shot using the racket R.

In the present embodiment, the sensing data analysis unit 501 specifies a generated shot, by recognizing a pattern of sensing data corresponding to the shot (action). In a shot of tennis using the racket R, for example, a pattern of particular sensing data is observed for each type of shot such as a forehand stroke, a back hand stroke, a serve and a smash. For example, in the case of sensing data provided by a motion sensor, the type of shot can be specified from the provided sensing data, if the attachment position of the sensor device 100 in the racket R is already known. A pattern of the sensing data is statistically extracted, for example, from a waveform of the sensing data observed when performing an actual shot, and is stored in the pattern DB 507. The sensing data analysis unit 501 specifies a shot, by matching a pattern stored in the pattern DB 507 with the acquired sensing data.

Here, in the present embodiment, the sensing data analysis unit 501 specifies a shot prior to a generation time of the shot (action), by a partial matching between the sensing data and the pattern. The sensing data analysis unit 501 analyzes acquired sensing data D in real time. This point will be additionally described with reference to FIG. 4 and FIG. 5. Sensing data D acquired along a time sequence t is illustrated in FIG. 4. FIG. 5 is a flow chart which shows an example of pattern matching executed by the sensing data analysis unit 501 for such sensing data D.

With reference to FIG. 4 and FIG. 5, in the case where sensing data of a time window W part with a length $t_L$ has been input, the sensing data analysis unit 501 starts an analysis process (S101). The sensing data analysis unit 501 executes pattern matching for the sensing data D within the time window W (S103). In the case where the probability of the sensing data D within the time window W matching a pattern exceeds a threshold (YES of S105), the sensing data analysis unit 501 detects that a shot corresponding to this pattern is generated at this time (S107). In the case where the probability of the sensing data D matching a pattern does not exceed a threshold in S105, the sensing data analysis unit 501 advances the time window W (for example, up to a latest position) (S109), and again executes pattern matching (S103).

In the illustrated example, the sensing data D up to a time $t_1$ is acquired, and pattern matching of the sensing data D within the time window W from a time up to the time $t_1$ is executed. In the case where the probability of the sensing data D matching a pattern exceeds a threshold, it is specified that a shot corresponding to this pattern is generated at this time (at the time of time $t_1$). In this case, the sensing data analysis unit 501 can specify a generation time $t_s$ of a shot, by assuming that sensing data $D_E$ from the time $t_1$ onwards conforms to the specified pattern. The generation time of the shot may be defined in association with the pattern of sensing data, for example, as a time when an impact of the ball to the racket is generated. In this way, in the present embodiment, a shot to be generated and a generation time of the shot can be specified prior to a shot actually being generated by the racket R.

In the present embodiment, a shot and a generation time of the shot can be specified at a stage prior to generation, regardless of whether or not a shot is actually generated in the racket R, by a configuration of the sensing data analysis unit 501 such as described above. Therefore, for example, the racket R is used for a practice swing or shadow play, a shot corresponding to the swing of the racket R can be specified, even in the case where an impact of the ball is not actually generated, and feedback corresponding to this shot can be provided. Note that, to continue, the processes of the feedback determination unit 503 and the feedback command generation unit 505 will be described on the assumption that feedback is provided in the case where an impact of the ball is not actually generated by the racket R.

(Feedback Determination Unit)

By again referring to FIG. 3, the feedback determination unit 503 determines feedback to be provided, in accordance with an action specified by the sensing data analysis unit 501. As described above, the action in the present embodiment is a shot generated in a play of tennis. For example, the sensing data analysis unit 501 may specify a class of a shot by analysis of the sensing data. In this case, data which shows feedback corresponding to the class of a specified shot is stored in the feedback DB 509. The feedback determination unit 503 selects data of appropriate feedback from among the stored data. Alternatively, an action (shot) may not be classified, and the feedback determination unit 503 may determine to provide common feedback for a shot to be generated.

Here, the class of a shot (action) in the present embodiment may be defined in accordance with the type of shot. The type of shot includes, for example, a forehand stroke, a back hand stroke, a serve, a smash or the like. Further, the class of the shot may be defined in accordance with the degree of skill of the shot. For example, patterns corresponding to a shot of a high level player, a shot of a medium level player and a shot of a low level player may be stored in the pattern DB 507 for each of the above types of shots, and the sensing data analysis unit 501 may determine the degree of skill of a shot.

In the present embodiment, feedback may be provided by a vibration or audio. More specifically, for example, in the case where the generation of some shot has been specified by the sensing data analysis unit 501, a vibration and/or sound effect which shows the shot may be output at the generation time of the shot. This vibration and/or audio may be common regardless of the class of the shot, or may be different for each class of the shot. For example, in the case where the class of a shot such as described above is defined in accordance with the type of shot and the degree of skill, feedback different for each combination of the type of shot and the degree of skill may be provided, or feedback different in accordance with the degree of skill of the shot may be provided, regardless of the type of shot.

In the above described example, a vibration or audio provided as feedback may be generated, for example, based on sensing data of a vibration or audio observed at the time when the user of the racket R has actually performed a shot in the past (at the time when an impact of the ball to the racket has been generated). That is, feedback may be generated based on sensing data of a first user acquired in the past, and may be provided to the first user himself or herself. In this case, by having a shot of the past of the user himself or herself reproduced, a play of the past can be relived.

Alternatively, a vibration or audio provided as feedback may be generated based on sensing data of a vibration or audio observed at the time when a user different from the user of the racket R has actually performed a shot in the past. That is, feedback may be generated based on sensing data of a first user acquired in the past, and may be provided to a second user different from the first user. In this case, by providing feedback generated based on sensing data of a high level player (first user) to a beginner level player (second user), for example, the timing of a correct shot and the feeling when accurately catching a ball can be virtually experienced, and can be an index for improvement.

Further, a vibration or audio provided as feedback may be generated separately from sensing data of a vibration or audio at the time of an actual shot, so that the generation of a (virtual) shot is easily understood by the user.

(Feedback Command Generation Unit)

The feedback command generation unit 505 generates a command for providing feedback determined by the feedback determination unit 503 at a generation time of an action specified by the sensing data analysis unit 501. For example, in the case where feedback is provided by a vibration, the command may include a control signal of a vibrator. Further, in the case where feedback is provided by audio, the command may include an audio signal input to a speaker. As described above, in the present embodiment, a generation time is specified at a stage prior to the generation of an action (shot), by the sensing data analysis unit 501. Therefore, the feedback command generation unit 505 controls an output timing of the command, so that feedback is output at a specified generation time. For example, in the case where the feedback command generation unit 505 is implemented by a processor of the smartphone 200 or the server 300, a delay by communication may be considered, in the control of an output timing of the command.

Note that, after an action (shot) to be generated, feedback corresponding to this and a generation timing of the shot have been specified, by processes such as those described above, the sensing data analysis unit 501, the feedback determination unit 503 and the feedback command generation unit 505 may continuously execute similar processes. That is, after a shot to be generated and a shot generation time have been specified, the sensing data analysis unit 501 may perform pattern matching of sensing data D while continuously advancing the time window W.

For example, in the case where the probability of the sensing data D matching a pattern has fallen below a threshold, as a result of advancing the time window W, the sensing data analysis unit 501 may cancel a generation estimation of the shot, and the generation and output of a command by the feedback command generation unit 505 may be stopped. Alternatively, in the case where the probability of the sensing data D matching another pattern has exceeded a threshold, as a result of advancing the time window W, the sensing data analysis unit 501 may correct a generation estimation of the shot, and the feedback determination unit 503 may select another feedback. Further, in the case where an estimation generation time of the shot has changed, as a result of advancing the time window W, the sensing data analysis unit 501 may correct an estimation of a generation time of the shot, and the timing at which the feedback command generation unit 505 outputs a command may be changed.

(1-3. Modified Example)

Heretofore, the first embodiment of the present disclosure has been described. Note that, various modified examples are possible in the present embodiment, and is not limited to the example described above. For example, in the above example, the sensor device 100 attached to the racket R includes an output unit 150 in addition to the sensor 110. In another example, a device which includes the sensor 110 and a device which includes the output unit 150 providing feedback may be different. For example, the sensor device 100 which does not include the output unit 150 and the reception unit 160, and another device which includes the output unit 150 and the reception unit 160, may be provided. This another device may additionally include a processor for controlling the output unit 150 in accordance with information received by the reception unit 160. Alternatively, the output unit 150 may be included in both the sensor device 100 and the another device.

The another device in the above modified example may be a vibrator unit, for example, attached to the racket R. An appropriate position for detecting motion of the racket R by the sensor 110, and an appropriate position for generating a vibration in the racket R by a vibrator included in the output unit 150, may be different. Accordingly, the vibrator unit can be attached at an appropriate position on the racket R, independent of the sensor device 100. Further, the another device may be a terminal device, for example, such as the smartphone 200. In this case, audio or a vibration of feedback generated at the time of a shot is output by the terminal device such as the smartphone 200 carried by a user. In this case, by using a speaker or a vibrator that is already in the smartphone 200, feedback can be conveniently provided, without incorporating an output device into the sensor device 100 or preparing a new device for output.

Alternatively, the another device providing feedback may be a wearable device worn by a user of the racket R. The wearable device is a glasses-type or wristwatch-type terminal device, for example, and is capable of being worn while a user is playing a sport. For example, in the case of a wristwatch-type wearable device, similar to the above example of the smartphone 200, feedback by audio or a vibration can be provided. Further, for example, in the case of a glasses-type wearable device, in addition to being able to provide feedback by audio or a vibration, it is also possible to provide feedback by an image.

Note that, in cases other than a glasses-type wearable device, for example, it is possible to provide visual feedback, by using an LED (Light Emitting Diode). Such feedback is not limited to a user holding and swinging the racket R, and may be provided for a friend, coach or the like, for example, who is watching this. Further, the above described visual, aural and/or tactile feedback may be combined and provided. In this case, for example, by using an output unit in each of a plurality of devices, such as a vibration from the sensor device 100 and audio from the smartphone 200, a plurality of various types of feedback may be provided. Further, by using an output unit in each of a plurality of devices, a same type of feedback may be provided. For example, there may be the case where an effective vibration can be felt by a user, by synchronizing vibrators in a plurality of devices as output units. Further, there may be the case where feedback of audio having a stereo effect can be provided, by synchronizing speakers of a plurality of devices as output units.

While the sensor device 100 is attached to the racket R in the above example, the sensor device 100 may be independently held by a user in another example. In this case, the sensor device 100 is used like a grip portion of a virtual racket. As described above, the present embodiment is assumed to provide feedback by the racket R swung by a user, in the case where an impact of the ball has not actually been generated. Therefore, swinging by the user is not limited to the racket R (hitting tool) which can hit a ball, and may be any type of object if the motion of a swing by holding can be performed.

Further, while the case has been described where an action of a target is a shot of tennis in the above example, a sport other than tennis, or an action other than that of a sport, may become a target in another example. For example, in a sport other than tennis, it may be possible to detect an event, such as a shot using a hitting tool (a bat, club, racket or the like) or the body of a user himself or herself, jumping, landing or the like, from the sensor data. Further, other than a sport, the generation of an action may be estimated beforehand, by training or the like performed by a manufacturer or builder, and may be useful for providing feedback corresponding to an action to be generated at a virtual generation time.

2. Second Embodiment (2-1. System Configuration)

FIG. 6 is a figure which shows a configuration example of a system according to a second embodiment of the present disclosure. With reference to FIG. 6, the system 20 includes a sensor device 600 and a smartphone 700. The system 20 may additionally include a server 800. Note that, the sensor device 600 and the smartphone 700 may be implemented, for example, by a hardware configuration of an information processing device, which will be described later. The server 800 may be implemented by a single server device having a hardware configuration of an information processing device, which will be described later, or by collaboration between a plurality of server devices having such a configuration.

The sensor device 600 is attached to a racket R of tennis. The sensor device 600 is the same as the sensor device 100 in the above first embodiment, for the point of including a sensor which provides sensing data of the racket R or a user who uses the racket R. However, in the present embodiment, the sensor device 600 may not have an output device. The sensor device 600 transmits sensing data to the smartphone 200 or the server 300. At this time, the sensing data may be pre-processed, by a processor of the sensor device 600.

The smartphone 700 receives sensing data transmitted from the sensor device 100, by wireless communication such as Bluetooth (registered trademark). The smartphone 700 may include a processor which executes an analysis process for providing feedback based on the sensing data. Alternatively, the smartphone 700 may transmit sensing data to the server 800 by network communication, and may request an analysis process for providing feedback based on the sensing data. Further, the smartphone 700 includes an imaging unit such as a camera, and captures a state in which a user of the racket R is playing tennis as a picture.

In the present embodiment, in addition to an analysis process such as described above or a transmission process of data, the smartphone 700 is also used to reflect on a play by a user. More specifically, the smartphone 700 reproduces a picture of a play of the user captured by the imaging unit, and projects the reproduced picture onto a display. In this way, the user can reflect on a play after the completion of the play. In addition, at this time, the smartphone 700 provides feedback corresponding to the play reproduced as a picture, by an image, audio, a vibration or the like. The smartphone 700 includes an output device for the provision of such feedback. Information related to feedback is obtained by an analysis process executed by the smartphone 700 itself, or is received from the server 800 to which an analysis process has been requested.

Note that, in the illustrated example, while a function which executes an analysis process or a transmission process of sensing data, a function which captures a play of a user as a picture, a function which reproduces a captured picture, and a function which provides feedback corresponding to a play reproduced as a picture, are consolidated in the smartphone 700 for the sake of convenience, the present embodiment is not limited to such an example. Part or all of the above functions may be implemented by separate devices. For example, in order to capture a play of a user as a picture, a digital camera may be separately prepared. Further, in order to reproduce a captured picture, a television may be separately prepared. In addition, the function which provides feedback may be implemented by the sensor device 600 which includes an output device. Further, similar to the above first embodiment, the smartphone 700 may be replaced, for example, by another type of terminal device, such as a tablet or a personal computer.

The server 800 receives sensing data transmitted from the sensor device 600 or the smartphone 700, by network communication. The sensor device 600 may be capable of directly communicating with the server 800, and not via the smartphone 700. Further, the server 800 transmits information related to feedback obtained by an analysis process of the sensing data to the sensor device 600 or the smartphone 700 by network communication. In the case where the system 20 includes the server 800, a processor included in one or a plurality of server devices, which implement the server 800, executes an analysis process.

FIG. 7 is a schematic block diagram which shows a configuration of a smartphone according to the second embodiment of the present disclosure. With reference to FIG. 7, the smartphone 700 includes a reception unit 710, a processing unit 720, a storage unit 730, a transmission unit 740, an output unit 750, and an imaging unit 760. The output unit 750 includes a display 751, a speaker 752 and/or a vibrator 753. Note that, the processing unit 720 is implemented by having a processor such as a CPU operate in accordance with programs. The storage unit 730 is implemented by a memory or a storage device. The reception unit 710 and the transmission unit 740 are implemented by a communication device. The output unit 750 is implemented by an output device. The imaging unit 760 is implemented by an imaging device. Hereinafter, each of the constituent elements will be additionally described.

Note that, as described above, the functions of the smartphone 700 may be implemented by distributing to a plurality of devices. In such a case, the block diagram shown in FIG. 7 is interpreted as showing a set of functions implemented by these devices.

The reception unit 710 receives, from the sensor device 600, for example, sensing data provided by an acceleration sensor, a gyro sensor, a geomagnetic sensor and/or a vibration sensor. Further, the reception unit 710 may receive, from the sensor device 600, sensing data provided by a temperature sensor, a humidity sensor, a sound sensor, an illuminance sensor or the like. Similar to the above first embodiment, a sensor included in the sensor device 600 provides sensing data, by setting the racket R or a user who uses the racket R as a target. Further, the reception unit 710 may receive, from the server 300, information related to feedback obtained by an analysis process.

The processing unit 720 executes an analysis process for providing feedback, for example, based on sensing data received from the sensor device 600. In this case, the processing unit 720 implements functional configurations for an analysis process, which will be described later. Different to the first embodiment, the analysis process may be implemented after the fact. Therefore, the processing unit 720 may perform reading for an analysis process, upon accumulating received sensing data in the storage unit 730. Alternatively, the processing unit 720 may perform transmission to the server 800 via the transmission unit 740 for an analysis process, upon temporarily accumulating received sensing data in the storage unit 730 as necessary.

Further, the processing unit 720 controls imaging of a play picture by the imaging unit 760. A play picture is captured in parallel with the acquisition of sensing data. The captured play picture is stored in the storage unit 730. In the present embodiment, feedback is provided based on an analysis result of sensing data, at the time of reproduction of a play picture. Therefore, it is desirable for the play picture and the sensing data to be synchronized. The processing unit 720 provides, for example, a time stamp common to the sensing data received from the sensor device 600 and the play picture captured by the imaging unit 760. Alternatively, the processing unit 720 is synchronized by correcting one or both of a time stamp of the sensing data and the play picture.

In addition, the processing unit 720 controls the reproduction of a play image by the display 751 and the speaker 752, and the provision of feedback by the display 751, the speaker 752 and/or the vibrator 753. More specifically, the processing unit 720 reproduces a play picture stored in the storage unit 730 by using the display 751 and the speaker 752, for example, in accordance with a user operation. At this time, the processing unit 720 controls the display 751, the speaker 752 and/or the vibrator 753, based on information obtained by an analysis process executed by itself, or received from the sensor device 600 or the server 800. In this way, feedback is provided to a user.

For example, feedback is provided by having the vibrator 753 transmit a vibration to the housing of the smartphone 700. Alternatively, feedback may be provided by having the speaker 752 output audio, or by having the display 751 display an image. Feedback is provided at a time corresponding to a generation time of an action generated in the reproduced play picture. Therefore, in the present embodiment, information for providing feedback is associated with a play image.

As described above, in the present embodiment, an analysis process for providing feedback based on sensing data may be executed, by a processor of the sensor device 600 or the server 800, instead of the processing unit 720 of the smartphone 700. In this case, the processor of the sensor device 600 or the server 800 implements functional configurations for an analysis process, which will be described later.

(2-2. Functional Configurations)

FIG. 8 is a schematic block diagram which shows the functional configurations for an analysis process in the second embodiment of the present disclosure. With reference to FIG. 8, the functional configurations include a sensing data analysis unit 531, a feedback determination unit 533, and a feedback command generation unit 535. As described above, these functional configurations are implemented by a processor of the smartphone 700, the sensor device 600 or the server 800. Further, the above functional configurations may refer to a sensing data DB 537, a pattern DB 539 and a feedback DB 541. In addition, feedback commands generated by the feedback command generation unit 535 may be stored in a feedback command DB 543. The sensing data DB 537, the pattern DB 539, the feedback DB 541 and the feedback command DB 543 are implemented by a memory or a storage device of the smartphone 700, the sensor device 600 or the server 800.

(Sensing Data Analysis Unit)

Similar to the first embodiment, the sensing data analysis unit 531 specifies a generated shot, by recognizing a pattern of sensing data corresponding to the shot (action). A pattern of sensing data is statistically extracted, for example, from a waveform of the sensing data observed when performing an actual shot, and is stored in the pattern DB 539. The sensing data analysis unit 501 specifies a shot, by matching a pattern stored in the pattern DB 507 with the acquired sensing data. The sensing data to be analyzed may be stored in advance in the sensing data DB 537.

Here, as a difference with the first embodiment, in the present embodiment, the sensing data analysis unit 531 can execute pattern matching of sensing data after the fact, for the sensing data stored in advance in the sensing data DB 537. In this case, the sensing data analysis unit 531 determines whether or not a shot (action) corresponding to a pattern has been generated in a sensing target, by matching the sensing data with the entire pattern. Since matching is executed by using the entire pattern, it is possible to perform an accurate specification based on the actual waveform of the sensing data, at a generation time of the shot.

Note that, the timing at which the sensing data analysis unit 531 executes an analysis is arbitrary. Similar to the first embodiment, the sensing data analysis unit 531 may execute an analysis at a timing close to real time for received sensing data, or may execute an analysis immediately after the reception of sensing data (after a play is completed). Further, the sensing data analysis unit 531 may execute an analysis at the time of the reproduction of a play picture or during reproduction. Alternatively, the sensing data analysis unit 531 may execute an analysis by performing a periodic batch process, for sensing data accumulated in the sensing data DB 537.

(Feedback Determination Unit)

Similar to the first embodiment, the feedback determination unit 533 determines feedback to be provided, in accordance with an action specified by the sensing data analysis unit 531. For example, data which shows feedback corresponding to the class of a shot specified by the sensing data analysis unit 531 is stored in the feedback DB 541. The feedback determination unit 533 selects data of appropriate feedback from among the stored data.

Here, in the present embodiment, since feedback is provided during reproduction of a play picture, it is possible to provide feedback as an image such as an icon displayed together with the play picture. Therefore, in the present embodiment, feedback may be provided by a vibration, audio or an image. More specifically, for example, in the case where the generation of some shot has been specified by the sensing data analysis unit 531, a vibration and/or sound effect which shows the shot may be output, at the generation time of the shot, and an icon which shows the shot may be displayed. This vibration, audio and/or sound effect may be common regardless of the class of the shot, or may be different for each class of the shot. Similar to the first embodiment, the class of the shot may include the type of shot or the degree of skill.

In the above example, the vibration or audio provided as feedback may be generated, for example, based on sensing data of a vibration or audio observed at the time when a user of the racket R, or a different user, actually performs a shot. Further, the vibration or audio provided as feedback may be generated separately from sensing data of a vibration or audio at the time of an actual shot, so that the generation of a (virtual) shot is easily understood by a user. In the case where an image is provided as feedback, an image such as an icon may be basically generated separately from sensing data at the time of an actual shot.

(Feedback Command Generation Unit)

Similar to the first embodiment, the feedback command generation unit 535 generates a command for providing feedback determined by the feedback determination unit 533 at a generation time of an action specified by the sensing data analysis unit 531. That is, the feedback command generation unit 535 generates a command so that feedback is provided at the time when an action (shot) has been generated in a picture, at the time when a play picture acquired together with sensing data is reproduced. For example, in the case where feedback is provided by a vibration, the command may include a control signal of the vibrator 753 of the smartphone 700. Further, in the case where feedback is provided by audio, the command may include an audio signal input to the speaker 752. In the case where feedback is provided by an image, the command may include image data such as an icon displayed together with the play picture by the display 751. The feedback command generation unit 535 may store, for example, the generated command in the feedback command DB 543, in association with a time stamp of a play image.

As described above, in the present embodiment, feedback is provided at the time of reproduction of a play picture. Therefore, a time series of a play is fixed, at the time when the feedback command generation unit 535 generates a command. Therefore, in the present embodiment, for example, control of an output timing of a command and continuous pattern matching in real time such as described above in the first embodiment may not be necessary, and it is possible, for example, to specify a generation time of an action (shot) by a time stamp of the play picture, and to generate a command for feedback so as to be executed by a time stamp corresponding to this generation time. Therefore, the processes by the feedback command generation unit 535 may not be executed in real time at the time of providing feedback, and it is possible, for example, to generate a command in advance and store the generated command in the feedback command DB 543.

In the second embodiment of the present disclosure such as described above, feedback generated based on sensing data at the time of a play is provided, at the time when referring to a play picture after the fact. In this way, it becomes possible for a play of the past to be relived with a more realistic sensation. Note that, in the present embodiment, similar to the first embodiment, feedback may be output from a plurality of devices. Further, the action of a target is not limited to a shot of tennis, and an action of a sport other than tennis, or an action other than that of a sport, may become a target.

3. Example of Feedback

Next, an example of feedback provided in an embodiment of the present disclosure, which includes the above two embodiments, will be described. As described above, a vibration, audio or image provided as feedback is generated, for example, based on sensing data acquired at the time when a user of the racket R, or another user, has actually performed a shot in the past. Hereinafter, first, an example of the generation of such feedback will be described.

(Generation of Feedback)

FIG. 9 is a figure for describing an example of an analysis process of sensing data. With reference to FIG. 9, primary data (sensing data) is obtained by sensing, and secondary data is obtained by analyzing the primary data by a prescribed algorithm. It can be said that the secondary data is abstract information extracted from the primary data.

For example, the primary data is raw data of the sensor or is data obtained by preprocessing (sampling, noise removal or the like) the raw data. More specifically, the primary data may include a detection value such as time, acceleration or angular velocity, a detection value of a vibration or the like. For such raw data, for example, an analysis is executed which uses pattern recognition or vibrational properties such as a Frequency Response Function (FRF) of the racket R. This analysis process is different to the analysis process executed by the sensor data analysis units 501 and 531 in the above embodiments, and may be a process which extracts features of the sensing data for generating feedback. The secondary data obtained by analysis may include, for example, the position on the racket R at which an impact of a ball has been generated, the strength of an impact, the type of shot (or swing), the swing velocity or the like.

Note that, for example, technology which uses pattern recognition of sensor data at the time of a shot is disclosed in WO 2013/136712 or the like. Further, for example, technology which specifies the position of impact by using an FRF is disclosed in WO 2013/069447 or the like.

FIG. 10 is a figure for describing an example of a feedback generation process using an analysis result of sensing data. With reference to FIG. 10, a generation process of feedback is executed, based on play data including the above primary data and secondary data (data generated at the time when a user plays tennis using the racket R), and a setting value. The setting value includes, for example, the strength of feedback, a duration time, an extension level or the like.

In the above example, feedback may be generated, for example, by extending the primary data. For example, in the case where a vibration waveform provided by a vibration sensor is included in the primary data, feedback of a vibration can be generated by equalizing this vibration waveform. In equalizing, for example, the amplitude of the vibration waveform is adjusted for each frequency band, so that a user can easily perceive a vibration transmitted to the racket R from a vibrator which is an output device. In this case, feedback of a vibration may be generated by simple amplification of the vibration waveform, without going through equalizing.

Further, in the above example, feedback may be generated based on the secondary data. For example, the secondary data may include data which shows the position on the racket R at which an impact of the ball has been generated. In this case, the class of an action (causing a hitting tool (racket R) to generate an impact) can be defined in accordance with the position of impact, and feedback of different audio or a different vibration can be prepared for each position. In the case where an impact has been generated close to the center part of the gut, or in the case where an impact has been generated close to the edge of the gut or close to the frame, a sound generated at the time of an actual shot or a vibration felt by the user will be different. Therefore, by generating feedback corresponding to each audio or vibration, the state of a swing can be recognized by a user.

The feedback of audio or a vibration generated here may schematically reproduce, for example, audio or a vibration at the time of an actual shot. Alternatively, feedback to be generated may be a symbolic audio or vibration which expresses abstract information extracted as the secondary data. For example, a voice message, such as "PERFECT!" in the case where an impact has been generated close to the center part of the gut, or "NOT GOOD!" in the case where an impact has been generated close to the edge of the gut or close to the frame, may be output as feedback. Similarly, it is possible to define the class of an action in accordance with the type of swing (shot), the degree of skill of the swing (shot), the swing velocity or the like, shown by the secondary data, and to prepare feedback different for each of these classes.

In the above example, in the case where feedback is generated based on the primary data, or in the case where feedback is generated based on the secondary data, the determination of feedback to be provided based on sensing data will be the same. Here, as described above, feedback may be generated based on sensing data of a user himself or herself who provides feedback, for example, sensing data acquired at the time of a previous play, or may be generated based on sensing data of a different user.

(Output of Feedback)

In the embodiment of the present disclosure, feedback of audio is output, for example, by a speaker. Further, feedback of a vibration is output by a vibrator. The vibrator may use, for example, an eccentric motor, a linear motor and/or a piezoelectric element. The type of vibrator may be selected, for example, so that a user can sense a more real vibration, in consideration of the vibration characteristics of the racket R. Alternatively, in order to implement effective feedback of a vibration, vibrators attached at a plurality of positions on the racket R may be synchronized.

Further, in the case where the wearable device in the first embodiment is used, in the second embodiment, it is possible to provide feedback of an image. Feedback of an image can be displayed, for example, as an icon such as that shown in FIG. 11. In the example shown in FIG. 11, in the second embodiment, an icon 1001 including text, such as "PERFECT!" in the case where an impact has been generated close to the center part of the gut, or "NOT GOOD!" in the case where an impact has been generated close to the edge of the gut or close to the frame, is displayed as feedback on a screen 1000 which reproduces a play picture. Further, feedback of an image may include an icon which shows the position of impact or the type of swing, or a numerical value which shows the swing velocity or the like. In this way, feedback of an image generated in the above embodiments may include a symbolic text or icon which expresses abstract information extracted as the secondary data.

4. Hardware Configuration

Next, with reference to FIG. 12, a hardware configuration of an information processing device according to an embodiment of the present disclosure will be described. FIG. 12 is a block diagram which shows a hardware configuration example of an information processing device according to an embodiment of the present disclosure. The illustrated information processing device 900 may implement, for example, the sensor device, smartphone or server in the above embodiments.

The information processing device 900 includes a central processing unit (CPU) 901, a read-only memory (ROM) 903, and a random access memory (RAM) 905. Also, the information processing device 900 may include a host bus 907, a bridge 909, an external bus 911, an interface 913, an input device 915, an output device 917, a storage device 919, a drive 921, a connection port 923, and a communication device 925. The information processing device 900 may further include an imaging device 933 and a sensor 935 as necessary. The information processing device 900 may include a processing circuit called a digital signal processor (DSP), an application specific integrated circuit (ASIC) or Field-Programmable Gate Array (FPGA) instead of or in addition to the CPU 901.

The CPU 901 functions as an arithmetic processing device and a control device and controls all or some of the operations in the information processing device 900 according to various programs recorded in the ROM 903, the RAM 905, the storage device 919, or a removable recording medium 927. The ROM 903 stores a program, an arithmetic parameter, and the like used by the CPU 901. The RAM 905 primarily stores a program used in execution of the CPU 901 and a parameter or the like appropriately changed in execution of the program. The CPU 901, the ROM 903, and the RAM 905 are connected to each other by the host bus 907 including an internal bus such as a CPU bus. Further, the host bus 907 is connected to the external bus 911 such as a Peripheral Component Interconnect/interface (PCI) bus via the bridge 909.

The input device 915 is, for example, an operation unit manipulated by a user, such as a mouse, a keyboard, a touch panel, a button, a switch, and a lever. Also, the input device 915 may be, for example, a remote control device using an infrared ray or other radio waves or may be, for example, an external connection device 929 such as a mobile phone corresponding to a manipulation of the information processing device 900. Also, the input device 915 includes, for example, an input control circuit that generates an input signal based on information input by a user and outputs the signal to the CPU 901. The user inputs various kinds of data to the information processing device 900 or instructs the information processing device 900 to perform a processing operation by manipulating the input device 915.

The output device 917 includes a device capable of notifying a user of the acquired information visually, audibly or with a tactile sense. Examples of the output device 917 include display devices such as a liquid crystal display (LCD) or an organic electroluminescence (EL) display, audio output devices such as a speaker and a headphone, and a vibrator. The output device 917 outputs a result obtained through the process of the information processing device 900 as a picture such as text or an image, as an audio such as a voice or an acoustic sound, or as vibration.

The storage device 919 is a data storage device configured as an example of the storage unit of the information processing device 900. The storage device 919 includes, for example, a magnetic storage device such as a hard disk device (HDD), a semiconductor storage device, an optical storage device, or a magneto-optical storage device. The storage device 919 stores a program or various kinds of data executed by the CPU 901 and various kinds of data acquired from the outside.

The drive 921 is a reader/writer for the removable recording medium 927 such as a magnetic disk, an optical disc, a magneto-optical disc, or a semiconductor memory, and is built in the information processing device 900 or is attached on the outside thereof. The drive 921 reads information recorded on the mounted removable recording medium 927 and outputs the information to the RAM 905. Also, the drive 921 writes a record on the mounted removable recording medium 927.

The connection port 923 is a port configured to connect a device to the information processing device 900. Examples of the connection port 923 include a Universal Serial Bus (USB) port, an IEEE1394 port, and a Small Computer System Interface (SCSI) port. Other examples of the connection port 923 include an RS-232C port, an optical audio terminal, and a High-Definition Multimedia Interface (HDMI) (registered trademark) port. When the external connection device 929 is connected to the connection port 923, various kinds of data can be exchanged between the information processing device 900 and the external connection device 929.

The communication device 925 is, for example, a communication interface including a communication device connected to a communication network 931. Examples of the communication device 925 include communication cards for a Local Area Network (LAN), Bluetooth (registered trademark), Wi-Fi, and a Wireless USB (WUSB). Also, the communication device 925 may be a router for optical communication, a router for an Asymmetric Digital Subscriber Line (ADSL), or modems for various kinds of communication. For example, the communication device 925 transmits and receives a signal or the like to and from the Internet or another communication device in conformity with a predetermined protocol such as TCP/IP. Also, the communication network 931 connected to the communication device 925 includes networks connected in a wired or wireless manner and includes, for example, the Internet, a household LAN, infrared ray communication, radio-wave communication, or satellite communication.

Examples of the imaging device 933 include an image sensor such as a charge coupled device (CCD) or a complementary metal oxide semiconductor (CMOS) and a device that images an actual space using various members such as lenses controlling formation of an image of a subject in the image sensor and generates a captured image. The imaging device 933 may be a device that captures a still image or may be a device that captures a moving image.

Examples of the sensor 935 include various sensors such as an acceleration sensor, a angular velocity sensor, a geomagnetic sensor, an illuminance sensor, a temperature sensor, an atmospheric pressure sensor or an audio sensor (a microphone). The sensor 935 acquires, for example, information regarding a posture state of the information processing device 900, such as a posture of the casing of the information processing device 900 or information regarding a surrounding environment of the information processing device 900, such as brightness or noise of the surroundings of the information processing device 900. Also, the sensor 935 may include a Global Positioning System (GPS) receiver that receives GPS signals and measures the latitude, longitude, and altitude of the device.

The example of the hardware configuration of the information processing device 900 has been described above. Each of the foregoing constituent elements may be configured using a general-purpose member or may be configured by hardware specialized for the function of each constituent element. The configuration can be modified appropriately according to a technical level at the time of realizing the embodiments.

5. Supplement

The embodiments of the present technology can include, for example, the above-described information processing device (a sensor device, a smartphone, a server, or the like), a system, an information processing device, an information processing method performed by the information processing device or the system, a program causing the information processing device to function, and a non-transitory type medium having the program stored therein.

The preferred embodiments of the present disclosure have been described in detail with reference to the appended drawings, but the technical scope of the present disclosure is not limited to the examples. It should be understood by those skilled in the art that various modifications, combinations, sub-combinations and alterations may occur depending on design requirements and other factors insofar as they are within the scope of the appended claims or the equivalents thereof.

The advantageous effects described in the present specification are merely descriptive and exemplary, and thus are not restrictive. That is, according to an embodiment of the technology related to the present disclosure, it is possible to obtain other advantageous effects apparent to those skilled in the art along with the foregoing advantageous effects or instead of the foregoing advantageous effects from the description of the present specification.

Additionally, the present technology may also be configured as below.

(1)

A feedback provision method including:

specifying, by a processor, an action generated in a target and a generation time of the action on the basis of sensing data of the target;

determining feedback to be provided in accordance with the specified action; and providing the feedback at a time corresponding to the generation time.

(2)

The feedback provision method according to (1), wherein specifying the action includes recognizing a pattern of sensing data corresponding to the action.

(3)

The feedback provision method according to (2), wherein specifying the action and the generation time includes specifying the action at a first time prior to the generation time by a partial matching between the sensing data and the pattern, and specifying the generation time by assuming the sensing data from the first time onwards conforms to the pattern.

(4)

The feedback provision method according to any one of (1) to (3), wherein specifying the action includes specifying a class of the action, and wherein determining the feedback includes selecting the feedback to be provided from among feedback prepared for each class of the action.

(5)

The feedback provision method according to (4), wherein the class of the action is defined in accordance with a type of the action or a degree of skill of the action.

(6)

The feedback provision method according to (4) or (5), wherein the action includes an action for generating an impact on a hitting tool, and wherein the class of the action is defined in accordance with a position on the hitting tool where the impact has been generated.

(7)

The feedback provision method according to any one of (1) to (6), wherein the sensing data is provided by a sensor included in a first device, and wherein providing the feedback includes providing feedback by using an output device included in the first device.

(8)

The feedback provision method according to any one of (1) to (6), wherein the sensing data is provided by a sensor included in a first device, and wherein providing the feedback includes providing feedback by using an output device included in a second device different from the first device.

(9)

The feedback provision method according to any one of (1) to (8), wherein, at a time when a picture acquired together with the sensing data is reproduced, providing the feedback incudes providing feedback at a time when the action has been generated in the picture.

(10)

The feedback provision method according to any one of (1) to (9), wherein the feedback is generated based on sensing data acquired in the past.

(11)

The feedback provision method according to (10), wherein the feedback is generated based on sensing data of a first user acquired in the past, and is provided to the first user himself or herself.

(12)

The feedback provision method according to (10), wherein the feedback is generated based on sensing data of a first user acquired in the past, and is provided to a second user different from the first user.

(13)

The feedback provision method according to any one of (10) to (12), wherein the feedback is generated by extending the sensing data acquired in the past.

(14)

The feedback provision method according to (13), wherein the feedback is generated by equalizing or amplifying a vibration waveform included in the sensing data acquired in the past.

(15)

The feedback provision method according to any one of (10) to (12), wherein the feedback is generated based on abstract information extracted from the sensing data acquired in the past.

(16)

The feedback provision method according to (15), wherein the feedback includes symbolic information that expresses the abstract information.

(17)

A system including:

a sensor device that acquires sensing data of a target;

an analysis device including a sensing data analysis unit that specifies an action generated in the target and a generation time of the action on the basis of the sensing data, a feedback determination unit that determines feedback to be provided in accordance with the specified action, and a feedback command generation unit that generates a command for providing the feedback at a time corresponding to the generation time; and an output device that outputs the feedback in accordance with the command.

(18)

An analysis device including:

a sensing data analysis unit that specifies an action generated in a target and a generation time of the action on the basis of sensing data of the target;

a feedback determination unit that determines feedback to be provided in accordance with the specified action; and a feedback command generation unit that generates a command for providing the feedback at a time corresponding to the generation time.

(19)

A system comprising:

circuitry configured to identify an action generated at a target and a generation time of the action based on sensor data corresponding to the target;

determine feedback to be provided in accordance with the identified action; and provide the feedback based on the generation time.

(20)

The system of (19), wherein the circuitry is configured to identify the action by recognizing a pattern of sensor data corresponding to the action.

(21)

The system of (20), wherein the circuitry is configured to:

identify the action at a first time prior to the generation time by a partial matching between the sensor data and the pattern, and identify the generation time by assuming the sensor data subsequent to the first time conforms to the pattern.

(22)

The system of (19), wherein the circuitry is configured to:

identify a class of the action, and determine the feedback by selecting feedback from among feedback prepared for each class of the action.

(23)

The system of (22), wherein the class of the action is defined in accordance with at least one of a type of the action or a degree of skill of the action.

(24)

The system of (22), wherein the action includes an action of causing an impact on a hitting tool, and the class of the action is defined in accordance with a position on the hitting tool where the impact has occurred.

(25)

The system of (19), wherein the sensor data is provided by a sensor included in, or attached to, a first device, and the circruity is configured to provide the feedback by using an output device included in, or attached to, the first device.

(26)

The system of (19), wherein the sensor data is provided by a sensor included in, or attached to, a first device, and the circuitry is configured to provide the feedback by using an output device included in, or attached to, a second device different from the first device.

(27)
The system of (19), wherein
at a time when a picture acquired together with the sensor data is reproduced, the circuitry is configured to provide the feedback at a time corresponding to an action in the picture.

(28)
The system of (19), wherein
the feedback is generated based on sensor data acquired in the past.

(29)
The system of (28), wherein
the feedback is generated based on sensor data of a first user acquired in the past, and is provided to the first user

(30)
The system of (28), wherein
the feedback is generated based on sensor data of a first user acquired in the past, and is provided to a second user.

(31)
The system of (28), wherein
the feedback is generated by extending the sensor data acquired in the past.

(32)
The system of (31), wherein
the feedback is generated by equalizing or amplifying a vibration waveform included in the sensor data acquired in the past.

(33)
The system of (28), wherein
the feedback is generated based on abstract information extracted from the sensor data acquired in the past.

(34)
The system of (33), wherein
the feedback includes symbolic information that expresses the abstract information.

(35)
The system of (19), wherein
the system is an electronic device.

(36)
The system of (19), further comprising:
a sensor configured to generate and output the sensor data; and
an electronic device including the circuitry configured to identify the action, determine the feedback and provide the feedback.

(37)
A system comprising:
a sensor device configured to generate sensor data corresponding to a target; and
computer-readable instructions, which when executed by an electronic device, cause the electronic device to
identify an action generated at the target and a generation time of the action based on the sensor data corresponding to the target acquired from the sensor device;
determine feedback to be provided to be provided in accordance with the identified action; and
output the feedback based on the generation time.

(38)
A non-transitory computer-readable medium including computer program instructions, which when executed by a system, causes the system to:
identify an action generated at a target and a generation time of the action based on sensor data corresponding to the target;
determine feedback to be provided in accordance with the identified action; and
provide the feedback based on the generation time.

REFERENCE SIGNS LIST 10 system
100, 600 sensor device
110 sensor
120 processing unit
130 storage unit
140 transmission unit
150 output unit
160 reception unit
200, 700 smartphone
710 reception unit
720 processing unit
730 storage unit
740 transmission unit
750 output unit
760 reception unit
770 imaging unit
300, 800 server
501, 531 sensor data analysis unit
503, 533 feedback determination unit
505, 535 feedback command generation unit

The invention claimed is:

1. A system, comprising: circuitry configured to:
receive sensor data;
process the sensor data to identify a first action at a first time generated at a target by recognizing a pattern of the sensor data corresponding to the first action;
identify a generation time of a second action to be generated at the target by assuming sensor data subsequent to the first time conforms to the pattern of the sensor data corresponding to the first action, the second action being to be generated after the first action, the generation time being a second time after the first time, the second time being a time at which the second action is to be generated;
determine feedback to be provided in accordance with the identified first action; and
provide at least one of vibrations and audio, that represent the determined feedback, at a timing based on the identified generation time.

2. The system of claim 1, wherein the circuitry is configured to recognize the pattern by a partial matching between the sensor data and the pattern.

3. The system of claim 1, wherein the circuitry is configured to:
identify a class of the first action; and
determine the feedback by selecting feedback from among feedback prepared for each class of the first action.

4. The system of claim 3, wherein
the class of the first action is defined in accordance with at least one of a type of the first action or a degree of skill of the first action.

5. The system of claim 3, wherein
the first action includes causing an impact upon a hitting tool, and
the class of the first action is defined in accordance with a position on the hitting tool where the impact has occurred.

6. The system of claim 1, wherein
the sensor data is provided by a sensor included in, or attached to, a first device, and
the circuitry is configured to provide the at least one of vibrations and audio by using an output device included in, or attached to, the first device.

7. The system of claim 1, wherein
the sensor data is provided by a sensor included in, or attached to, a first device, and the circuitry is configured to provide the at least one of vibrations and audio by using an output device included in, or attached to, a second device different from the first device.
8. The system of claim 1, wherein
at a time when a picture acquired together with the sensor data is reproduced, the circuitry is configured to provide the at least one of vibrations and audio at a time corresponding to an action in the picture.
9. The system of claim 1, wherein
the at least one of vibrations and audio are generated based on sensor data acquired in the past.
10. The system of claim 9, wherein
the at least one of vibrations and audio are generated based on sensor data of a first user acquired in the past, and is provided to the first user.
11. The system of claim 9, wherein
the at least one of vibrations and audio are generated based on sensor data of a first user acquired in the past, and is provided to a second user.
12. The system of claim 9, wherein
the at least one of vibrations and audio are generated by extending the sensor data acquired in the past.
13. The system of claim 12, wherein
the at least one of vibrations and audio are generated by equalizing or amplifying a vibration waveform included in the sensor data acquired in the past.
14. The system of claim 9, wherein
the at least one of vibrations and audio are generated based on abstract information extracted from the sensor data acquired in the past.
15. The system of claim 14, wherein
the at least one of vibrations and audio express symbolic information that expresses the abstract information.
16. The system of claim 1, wherein
the system is an electronic device.
17. The system of claim 1, further comprising:
a sensor configured to capture signals and generate and output the sensor data based on the signals; and
an electronic device including the circuitry.
18. A system comprising:
a sensor device configured to:
  capture signals corresponding to a target; and
  generate sensor data based on the signals; and
circuitry configured to:
  process the sensor data, generated by the sensor device, to identify a first action at a first time generated at the target by recognizing a pattern of the sensor data corresponding to the first action;
  identify a generation time of a second action to be generated at the target by assuming sensor data subsequent to the first time conforms to the pattern of the sensor data corresponding to the first action, the second action being to be generated after the first action, the generation time being a second time after the first time, the second time being a time at which the second action is to be generated;
  determine feedback to be provided in accordance with the identified first action; and
  output at least one of vibrations and audio, that represents the determined feedback, at a timing based on the identified generation time.
19. A non-transitory computer-readable medium including computer program instructions, which when executed by a system, cause the system to:
  receive sensor data;
  process the sensor data to identify a first action at a first time generated at a target by recognizing a pattern of the sensor data corresponding to the first action;
  identify a generation time of a second action to be generated at the target by assuming sensor data subsequent to the first time conforms to the pattern of the sensor data corresponding to the first action, the second action being to be generated after the first action, the generation time being a second time after the first time, the second time being a time at which the second action is to be generated;
  determine feedback to be provided in accordance with the identified first action; and
  provide at least one of vibrations and audio, that represent the determined feedback, at a timing based on the identified generation time.
20. The system of claim 7, wherein
the second device is a wearable device worn by a user.
21. The system of claim 1, wherein
the circuitry is configured to identify the generation time of the second action prior to the second action actually being generated.
22. The system of claim 1, wherein
the sensor data is audio sensor data.
23. The system of claim 18, wherein
the signals are audio signals, and
the sensor data is audio sensor data.
24. The non-transitory computer-readable medium of claim 19, wherein
the sensor data is audio sensor data.

* * * * *